United States Patent [19]

Toda et al.

[11] Patent Number: 5,616,528
[45] Date of Patent: Apr. 1, 1997

[54] DIELECTRIC CERAMIC COMPOSITION, MULTILAYER RESONATOR MADE OF SAID COMPOSITION AND MULTILAYER FILTER USING SAID RESONATOR

[75] Inventors: Hirofumi Toda; Shinjiro Shimo; Nobuyoshi Fujikawa; Shinji Isoyama; Kouichi Maruta, all of Kokubu, Japan

[73] Assignee: Kyocera Corporation, Kyoto, Japan

[21] Appl. No.: 564,816

[22] Filed: Nov. 29, 1995

[30] Foreign Application Priority Data

Nov. 29, 1994 [JP] Japan .................................. 6-294258
Mar. 30, 1995 [JP] Japan .................................. 7-073275
May 30, 1995 [JP] Japan .................................. 7-132092

[51] Int. Cl.$^6$ .................................. C04B 35/465
[52] U.S. Cl. .................................. 501/136; 333/219.1
[58] Field of Search .................................. 501/136; 333/219.1

[56] References Cited

U.S. PATENT DOCUMENTS

| | | | |
|---|---|---|---|
| 4,506,026 | 3/1985 | Hodgkins et al. | 501/136 |
| 4,845,062 | 7/1989 | Burn | 501/136 |
| 5,376,603 | 12/1994 | Hirahara et al. | 501/136 |
| 5,470,808 | 11/1995 | Okuyama et al. | 501/136 |
| 5,484,753 | 1/1996 | Kagata et al. | 501/136 |

FOREIGN PATENT DOCUMENTS

| | | | |
|---|---|---|---|
| 405266710 | 10/1993 | Japan | 501/136 |
| 405266711 | 10/1993 | Japan | 501/136 |

*Primary Examiner*—Karl Group
*Attorney, Agent, or Firm*—Loeb & Loeb LLP

[57] ABSTRACT

A dielectric ceramic composition comprising main components represented by a composition formula on the weight basis, $a\text{MgO} \cdot b\text{CaO} \cdot c\text{TiO}_2$, wherein a, b and c satisfy the following relationships, $25 \leq a \leq 35$, $0.3 \leq b \leq 7$, $60 \leq c \leq 70$, $a+b+c=100$, blended with a boron-containing compound in an amount of from 3 to 20 parts by weight reckoned as $B_2O_3$ and an alkali metal-containing compound in an amount of from 1 to 12 parts by weight reckoned as the alkali metal carbonate per 100 parts by weight of the main components, as well as a multilayer resonator made of said composition, and a filter using said resonator. The ceramic composition can be fired together with a conductor metal such as Ag or Cu at a relatively low temperature of 900° to 1050° C., exhibits large dielectric constant and Q-value, and a relatively small temperature coefficient τf, lending itself well for use as a material for high-frequency electronic parts. The resonator made of this ceramic composition exhibits excellent tproperties in high-frequency regions, and can be realized in a small size.

11 Claims, 2 Drawing Sheets

DIELECTRIC CERAMIC COMPOSITION, MULTILAYER RESONATOR MADE OF SAID COMPOSITION AND MULTILAYER FILTER USING SAID RESONATOR

BACKGROUND OF THE INVENTION

1. (Field of the Invention)

The present invention relates to a dielectric composition that can be favorably used in high-frequency regions and, particularly, in microwave regions and that can be fired at a low temperature. More particularly, the invention relates to a dielectric ceramic composition that is suited for use as an electronic part having internal conductors such as resonator, capacitor, filter and substrates incorporating them, and relates to a multilayer resonator made of the above-mentioned composition as well as to a multilayer filter using the above-mentioned resonator.

2. (Description of the Prior Art)

A variety of dielectric ceramics have heretofore been widely used as dielectric materials for electronic parts having internal conductors such as resonators, capacitors, filters and substrates containing them. Accompanying the development and widespread use of high-frequency devices such as mobile communication equipment as represented by portable telephones in recent years, the dielectric ceramics have been positively utilized as electronic parts for use in high-frequency regions.

In order that the dielectric ceramics and the internal conductors can be fired together (cofired), the internal conductors that are printed have been composed of a metal such as Pt, Pd, W, Mo or the like having a melting point higher than the firing temperature of the dielectric ceramics such as alumina, steatite, forsterite or the like, so that the internal conductors will not be melted at the firing temperature of the dielectric ceramics.

However, the above-mentioned metals have such large resistances that the electronic parts exhibit large Q-values in the resonance circuits leaving a problem of large transmission losses.

In an attempt to solve such a problem, there have been proposed a variety of dielectric ceramics using, as a conductor, a metal such as Ag or Cu having small resistance and that can be fired at low temperatures. In order to meet the demand for realizing high-frequency electronic circuit substrates in small sizes maintaining high performance, furthermore, a variety of composite dielectrics have been proposed according to which a high dielectric constant εr is exhibited in a particular frequency region to reduce the sizes of the resonator circuit and the filter. Moreover, the dielectric ceramics have been designed to exhibit large Q-values, such that the resonator circuit and filter exhibit large Q-values, too, enabling losses to be decreased.

Japanese Laid-Open Patent Publication No. 292460/1992 discloses a dielectric ceramic composition comprising an anorthite ($CaO \cdot Al_2O_3 \cdot 2SiO_2$)-calcium titanate glass and $TiO_2$. This dielectric ceramic composition can be fired at such a low temperature that a metal such as Ag or Cu can be fired as a conductor at the same time.

With the dielectric ceramic composition disclosed in Japanese Laid-Open Patent Publication No. 292460/1992, however, the dielectric constant εr is as low as 16 or smaller as measured in a high-frequency region of from 4 to 6 GHz, imposing limitation on decreasing the size of the high-frequency electronic parts.

Furthermore, the dielectric ceramic composition has a Q-value of as low as about 330 at a frequency of 6 GHz and, hence, a resonance circuit exhibits a small Q-value, too.

A ceramic composition of a three-component system, i.e., $MgO—CaO—TiO_2$ has been widely known having a low dielectric loss (high Q-value) and a small temperature coefficient of dielectric constant.

This composition exhibits excellent dielectric properties, e.g., a dielectric constant of about 20, a Q-value of about 8000 at 7 to 8 GHz and a temperature coefficient τf of resonance frequency of nearly 0.

However, this composition has a firing temperature of not lower than 1300° C. and makes it difficult to use Ag (melting point, 962° C.) as an internal conductor.

There has further been known a composition obtained by blending the above-mentioned $MgO—CaO—TiO_2$ three component system with boron or a boron-containing compound.

When the $MgTiO_3—CaTiO_3$ system is blended with boron or the boron-containing compound only, however, the firing temperature is not lowered to a sufficient degree when the blending amount is small, and the composition is not sintered at a temperature which is lower than the melting temperature of Ag or the like. When the blending amount is too large, on the other hand, the firing temperature is lowered but boron or the boron-containing compound reacts with the $MgTiO_3—CaTiO_3$ system at a temperature of the firing. When the blending amount is too large, therefore, the unreacted $MgTiO_3—CaTiO_3$ remains in a small amount after the firing, making it difficult to maintain a high Q-value of not smaller than, for example, 500.

With the conventional composition comprising $MgO—CaO—TiO_2$-boron or boron compound only, therefore, it is difficult to obtain a ceramic composition for electronic parts having low firing temperature and excellent dielectric properties in high-frequency regions.

SUMMARY OF THE INVENTION

The present invention was accomplished in view of the above-mentioned problems, and its object is to provide a dielectric ceramic composition which has such features that it can be fired together with a conductor metal such as Ag or Cu simultaneously at a temperature which is relatively as low as 900° to 1050° C., it exhibits a large dielectric constant εr and a large Q-value and it has a relatively small temperature coefficient τf of resonance frequency, lending itself well for obtaining high-frequency electronic parts in small sizes maintaining high performance.

Another object of the present invention is to provide a multilayer resonator made of the above-mentioned dielectric ceramic composition.

A further object of the present invention is to provide a multilayer filter using the above-mentioned resonator.

According to the present invention, there is provided a dielectric ceramic composition comprising, as main components, oxides of metal elements Mg, Ca and Ti and represented by a composition formula on the weight basis, wherein a, b and c satisfy the following relationships, $25 \leq a \leq 35$ $0.3 \leq b \leq 7$ $60 \leq c \leq 70$ $a+b+c=100$ blended with a boron, containing compound in an amount of from 3 to 20 parts by weight reckoned as $B_2O_3$ and an alkali metal-containing compound in an amount of from 1 to 12 parts by weight reckoned as the alkali metal carbonate per 100 parts by weight of said main components.

According to the present invention, furthermore, there is provided a ceramic composition comprising, as main components, oxides of Mg, Ca and Ti and represented by the following formula, (100−x)$MgTiO_3$·$xCaTiO_3$ wherein x represents a weight ratio and lies within a range of $1 \leq x \leq 15$.

When the dielectric ceramic composition of the present invention contains a lithium compound as an alkali metal-containing compound, it is desired that the amount of its blend is from 1 to 10 parts by weight reckoned as $Li_2CO_3$ per 100 parts by weight of the main components. When the dielectric ceramic composition of the invention contains a sodium compound, it is desired that the amount of its blend is from 1 to 12 parts by weight reckoned as $Na_2CO_3$.

According to the present invention, furthermore, there is provided a multilayer resonator comprising the above-mentioned dielectric ceramic composition and a metal conductor and a multilayer filter using the resonator.

The ceramic composition of the present invention comprises the above-mentioned MgO—CaO—$TiO_2$ three-component composition of a particular composition ratio and, particularly, the $MgTiO_3$—$CaTiO_3$ composition, blended with a boron-containing compound and an alkali metal-containing compound at particular weight ratios. The ceramic composition of the present invention can be fired at a temperature which is very lower than the firing temperature of, for example, the $MgTiO_3$—$CaTiO_3$ composition, and exhibits excellent dielectric properties such as Q-value and τf.

When the $MgTiO_3$—$CaTiO_3$ composition is blended with the boron-containing compound only in an amount of smaller than 5 parts by weight reckoned as $B_2O_3$, the sintering temperature of the composition does not become lower than 950° C.

When its blending amount is not smaller than 20 parts by weight reckoned as $B_2O_3$, on the other hand, the sintering temperature can be brought to be lower than 950° C., but the boron-containing compound reacts with $MgTiO_3$—$CaTiO_3$ during the firing. When the blending amount of the boron-containing compound is too large, therefore, most of $MgTiO_3$—$CaTiO_3$ in the composition reacts with the boron-containing compound; i.e., the amount of unreacted crystalline $MgTiO_3$—$CaTiO_3$ decreases and, hence, the sintered ceramic composition exhibits a Q-value of not larger than 500.

That is, in the case of this composition, an attempt to lower the sintering temperature of the composition by the addition of the boron-containing compound has a conflicting nature in regard to improving dielectric properties of the ceramic composition after firing. With the composition comprising $MgTiO_3$—$CaTiO_3$-boron-containing compound only, therefore, it is difficult to obtain excellent dielectric properties such as low sintering temperature, high Q-value, etc.

On the other hand, when $MgTiO_3$—$CaTiO_3$ is blended with a compound containing an alkali metal such as Li, Na, etc. only, it is not allowed to lower the sintering temperature of the composition despite the amount of its addition is increased. That is, it is not allowed to obtain a composition that can be sintered at a temperature of not higher than, for example, 950° C.

According to the composition of the present invention which is blended with the boron-containing compound and the alkali metal-containing compound at particular ratios, on the other hand, the boron-containing compound and the $MgTiO_3$—$CaTiO_3$ composition do not react with each other to a large degree and, besides, the sintering temperature can be lowered compared with that of when the boron-containing compound only is added.

According to the above-mentioned particularly blended dielectric ceramic composition of the present invention, it is allowed to lower the sintering temperature as well as to obtain improved dielectric properties such as Q-value and τf that were so far difficult to accomplish. That is, the present invention provides a dielectric ceramic composition which can be fired together with metal conductors such as of Ag, Cu or the like element simultaneously, and can be favorably used for producing electronic parts that are fabricated in small sizes yet maintaining high performance.

BRIEF DESCRIPTION OF THE DRAWINGS

In these drawings, reference numeral 1 denotes a dielectric ceramic, 2 denotes an electrode for resonance, 3 denotes an earth electrode, and reference numeral 4 denotes an input/output electrode.

DETAILED DESCRIPTION OF THE PREFERRED EMBODIMENTS

The dielectric ceramic composition of the present invention comprises, as main components, oxides of metal elements Mg, Ca and Ti and is represented by a composition formula on the weight basis, aMgO·bCaO·$cTiO_2$ wherein a, b and c satisfy the following relationships, $25 \leq a \leq 35$ $0.3 \leq b \leq 7$ $60 \leq c \leq 70$ a+b+c=100 and is further blended with a boron-containing compound in an amount of from 3 to 20 parts by weight reckoned as $B_2O_3$ and an alkali metal-containing compound such as of lithium or sodium in an amount of from 1 to 12 parts by weight reckoned as an alkali metal carbonate such as $Li_2CO_3$ or $Na_2CO_3$ per 100 parts by weight of the main components.

In the above-mentioned composition formula, the weight ratio a of MgO is selected to be $25 \leq a \leq 35$, and the weight ratio b of CaO is selected to be $0.3 \leq b \leq 7$. This is because, the temperature coefficient of resonance frequency excessively increases toward the positive side when the weight ratio of MgO is smaller than 25 or when the weight ratio of CaO exceeds 7. Conversely, when the weight ratio a of MgO exceeds 35 or when the weight ratio b of CaO is smaller than 0.3, the temperature coefficient of resonance frequency excessively decreases toward the negative side. Therefore, the weight ratio a of MgC and the weight ratio b of CaO are specified to be $25 \leq a \leq 35$ and $0.3 \leq b \leq 7$. Particularly desirably, these weight ratios should be $28 \leq a \leq 34$ and $0.4 \leq b \leq 6.5$ from the standpoint of temperature coefficient τf of resonance frequency of the dielectric ceramics.

Furthermore, the weight ratio c of $TiO_2$ is specified to be $60 \leq c \leq 70$. This is because, the Q-value decreases when the weight ratio of $TiO_2$ is smaller than 60 or is larger than 70. Therefore, the weight ratio c of $TiO_2$ is specified to be $60 \leq c \leq 70$ and, particularly, $64 \leq c \leq 68$ from the standpoint of Q-value of the dielectric ceramics.

According to the present invention, furthermore, a boron-containing compound is added in an amount of from 3 to 20 parts by weight reckoned as $B_2O_3$, and an alkali metal-containing compound such lithium-containing compound or sodium-containing compound is added in an amount of from 1 to 12 parts by weight reckoned, for example, as $Li_2CO_3$ or $Na_2CO_3$ per 100 parts by weight of the main components.

As described above, the boron-containing compound is added in an amount of from 3 to 20 parts by weight reckoned as $B_2O_3$ per 100 parts by weight of the main components. This is because, when the amount of addition of $B_2O_3$ is smaller than 3 parts by weight, the dielectric ceramic composition is not sintered despite it is fired at 1100° C. That is, the composition is not fired simultaneously with Ag or Cu. Or, the composition is not densely formed if it could be fired. When the amount of addition exceeds 20 parts by weight, on the other hand, the crystal phase changes, e.g., $MgTiO_3$—$CaTiO_3$ phase changes to deteriorate the ceramic properties.

According to the present invention, therefore, the boron-containing compound is added in an amount of from 3 to 20 parts by weight reckoned as $B_2O_3$ per 100 parts by weight of the main components and, particularly, in an amount of from 3 to 15 parts by weight from the standpoint of Q-value of the dielectric ceramics.

As the boron-containing compound, there can be exemplified metal boron, $B_2O_3$, Colemanite, and $CaB_2O_4$. Among them, $B_2O_3$ is particularly desired.

The alkali metal-containing compound such as lithium-containing compound or sodium-containing compound is added in an amount of from 1 to 12 parts by weight reckoned as, for example, $Li_2CO_3$ or $Na_2CO_3$. This is because, when the amount of addition of $Li_2CO_3$ or $Na_2CO_3$ is smaller than 1 part by weight, the dielectric ceramic composition is not sintered despite it is fired at a temperature of 1100° C. Therefore, the composition is not sintered simultaneously with Ag or Cu, or the composition is not densely formed despite it is fired. When the amount of addition exceeds 12 parts by weight, on the other hand, the crystal phase undergoes a change to deteriorate the ceramic properties. Examples of the alkali metal include Li, Na and K, and examples of the alkali metal-containing compound includes carbonates and oxides of the above-mentioned alkali metals.

When the lithium-containing compound is added, it is desired that the amount of addition is from 1 to 10 parts by weight reckoned as $Li_2CO_3$ per 100 parts by weight of the main components and, particularly, from 3 to 7 parts by weight from the standpoint of Q-value of the dielectric ceramics.

When the sodium-containing compound is added, it is desired that the amount of addition is from 5 to 9 parts by weight reckoned as $Na_2CO_3$ per 100 parts by weight of the main components from the standpoint of Q-value of the dielectric ceramics.

Of the dielectric ceramic compositions of the present invention, further improved temperature coefficient τf of resonance frequency and Q-value are exhibited by a dielectric ceramic composition which comprises, as main components, oxides of Mg, Ca and Ti and is represented by a composition formula $(100-x)MgTiO_3 \cdot xCaTiO_3$ (wherein x denotes a weight ratio and lies within a range of $1 \leq x \leq 15$), and is further blended with the boron-containing compound in an amount of from 3 to 20 parts by weight reckoned as $B_2O_3$ and with the lithium-containing compound in an amount of from 1 to 10 parts by weight reckoned as $Li_2CO_3$ per 100 parts by weight of the main components.

The composition of this embodiment uses $MgTiO_3$ and $CaTiO_3$ as starting materials so as to contain $(Mg, Ca)TiO_3$ particles or $MgTiO_3$ particles and $CaTiO_3$ particles in large amounts as crystals in order to improve Q-value and to easily control the temperature coefficient. Here, the weight ratio of $CaTiO_3$ is selected to be $1 \leq x \leq 15$. This is because, the temperature coefficient τf of resonance frequency greatly deviates toward the negative side when the weight ratio of $CaTiO_3$ is smaller than 1, and greatly deviates toward the positive side when the above weight ratio exceeds 15. It is therefore desired that the weight ratio x of $CaTiO_3$ lies within a range of from 1 to 15 and, particularly, from 5 to 10 from the standpoint of the temperature coefficient τf of resonance frequency of the dielectric ceramics.

Because of the same reasons as described above, the boron-containing compound is added in an amount of from 3 to 20 parts by weight reckoned as $B_2O_3$ and the lithium-containing compound is added in an amount of from 1 to 10 parts by weight reckoned as $Li_2CO_3$ per 100 parts of the main components. In the case of the composition of this embodiment, it is particularly desired that the boron-containing compound is added in an amount of from 5 to 15 parts by weight reckoned as $B_2O_3$ and the lithium-containing compound is added in an amount of from 3 to 7 parts by weight reckoned as $Li_2CO_3$.

The composition of the embodiment of the present invention may be further blended with oxides of Si, Zn, Mn, Na, K and the like in amounts that do not adversely affect the dielectric properties. In this case, the composition can be fired at a lower temperature.

In the dielectric comprising the composition of this embodiment of the present invention, the boron-containing compound that are added react with part of Mg, Ti and Ca that are constituent elements of the main components to form a glass phase or a crystal phase, and exist in the grain boundaries among the $(Mg, Ca) TiO_3$ particles, or in the grain boundaries among the $(Mg, Ca) TiO_3$ particles, $MgTiO_3$ particles, $CaTiO_3$ particles, MgO particles, CaO particles and $TiO_2$ particles. As for boron, the sintered product was observed using an X-ray microanalyzer (EPMA) to make sure that boron existed in the grain boundaries. As for lithium, its existence has not been confirmed yet. When no lithium is added, Mg, Ca and Ti in the main components diffuse toward the side of boron in the grain boundaries to form a glass phase. However, the addition of lithium suppresses the rate of diffusion. From this result, it is presumed that lithium exists in the grain boundaries together with boron. According to the present invention, it is most desired that the sintered product contains $(Mg, Ca)TiO_3$ as much as possible, and, next, that $MgTiO_3$ and $CaTiO_3$ are contained in large amounts. From this point of view, the most desired dielectric ceramic composition comprises the main components represented by a composition formula $(100-x)MgTiO_3 \cdot xCaTiO_3$ ($1 \leq x \leq 15$) blended with the boron-containing compound and the lithium-containing compound in predetermined amounts.

According to another preferred embodiment of the present invention, the dielectric ceramic composition comprises main components represented by a composition formula $(100-x)MgTiO_3 \cdot xCaTiO_3$ (wherein x denotes a weight ratio and lies within a range of $1 \leq x \leq 15$) and is blended with the boron-containing compound in an amount of from 3 to 20 parts by weight reckoned as $B_2O_3$ and the sodium-containing compound in an amount of from 1 to 12 parts by weight reckoned as $Na_2CO_3$ per 100 parts by weight of the main components.

The composition of this embodiment also exhibits excellent temperature coefficient τf of resonance frequency and Q-value of the dielectric ceramic. Even in the composition of this embodiment, it is particularly desired that x in the composition formula of the main components lies within a range of from 5 to 10 like in the composition of the above-mentioned embodiment. In the case of the composition of this embodiment, furthermore, it is particularly desired that the boron-containing compound is added in an amount of from 3 to 9 parts by weight reckoned as $B_2O_3$ and the sodium-containing compound is added in an amount of from 5 to 9 parts by weight reckoned as $Na_2CO_3$.

Even the composition of this embodiment may be blended with oxides of Si, Zn, Mn, Li, K and the like in amounts that do not adversely affect the dielectric properties. In this case, the composition can be fired at a lower temperature.

In the composition of this embodiment, the boron-containing compound react with part of Mg, Ti and Ca which are constituent elements of the main components to form a glass phase or a crystal phase, and exist in the grain boundaries among the (Mg, Ca)$TiO_3$ particles, or in the grain boundaries among the (Mg, Ca)$TiO_3$ particles, $MgTiO_3$ particles and $CaTiO_3$ particles.

To obtain the dielectric ceramic composition of the present invention, the starting powders of $MgCO_3$, $CaCO_3$ and $TiO_2$ or the starting powders of $MgTiO_3$ and $CaTiO_3$ are weighed, mixed together, pulverized, and are calcined at a temperature of from 1000° to 1300° C. for 1 to 3 hours.

Then, a powder of boron-containing compound such as $B_2O_3$ and a powder of lithium-containing compound such as $Li_2CO_3$ or a powder of sodium-containing compound such as $Na_2CO_3$ are weighed and mixed together with the calcined product obtained as described above, followed by pulverization and molding using a press mold. After the binder is removed in the open air, the molded article is fired in the open air or in an nitrogen atmosphere at a temperature of 900° to 1050° C. for 0.5 to 2 hours.

The dielectric ceramic composition of the present invention can be fired together with a conductor metal such as Ag or Cu simultaneously at a temperature which is relatively as low as 900° to 1050° C., and exhibits a large dielectric constant εr, a large Q-value and a small temperature coefficient τf of resonance frequency, making it possible to realize high-frequency electronic circuit boards in small sizes maintaining high performance.

A multilayer resonator can be produced by using the dielectric ceramic composition of the present invention and a filter can be produced by using the above resonator, for example, in a manner as described in detail in Example 3 appearing later.

That is, a powder of the dielectric ceramic composition of the present invention, a binder, zirconia ball and water are mixed together, from which a green tape having a predetermined thickness is formed by such a method as pull-up process, doctor blade process.

Onto the green tape is then printed a conductor pattern by using, for example, a paste for printing Ag. A predetermined number of multilayer layers are then press-adhered together with the green tape printed with conductor pattern sandwiched among them.

Figure 1:
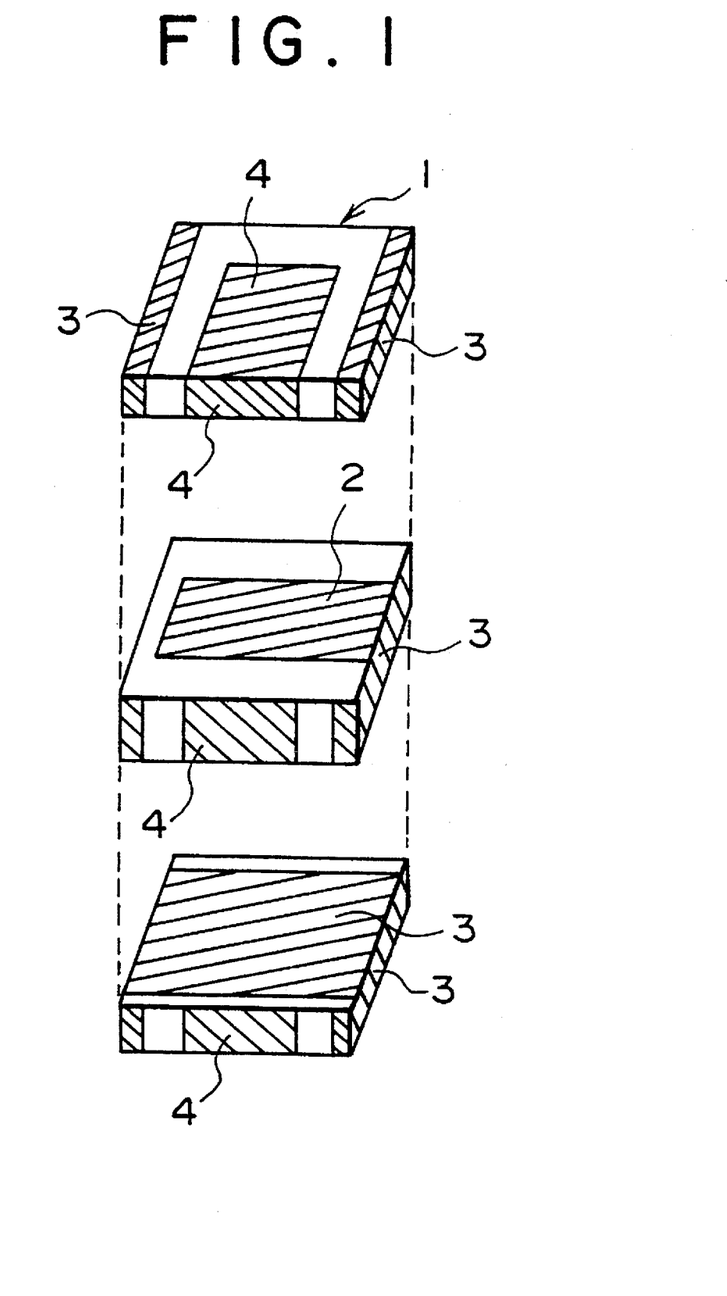
FIG. 1 is a perspective view illustrating, in a disassembled manner, a multilayer resonator using a composition of the present invention.
Figure 2:
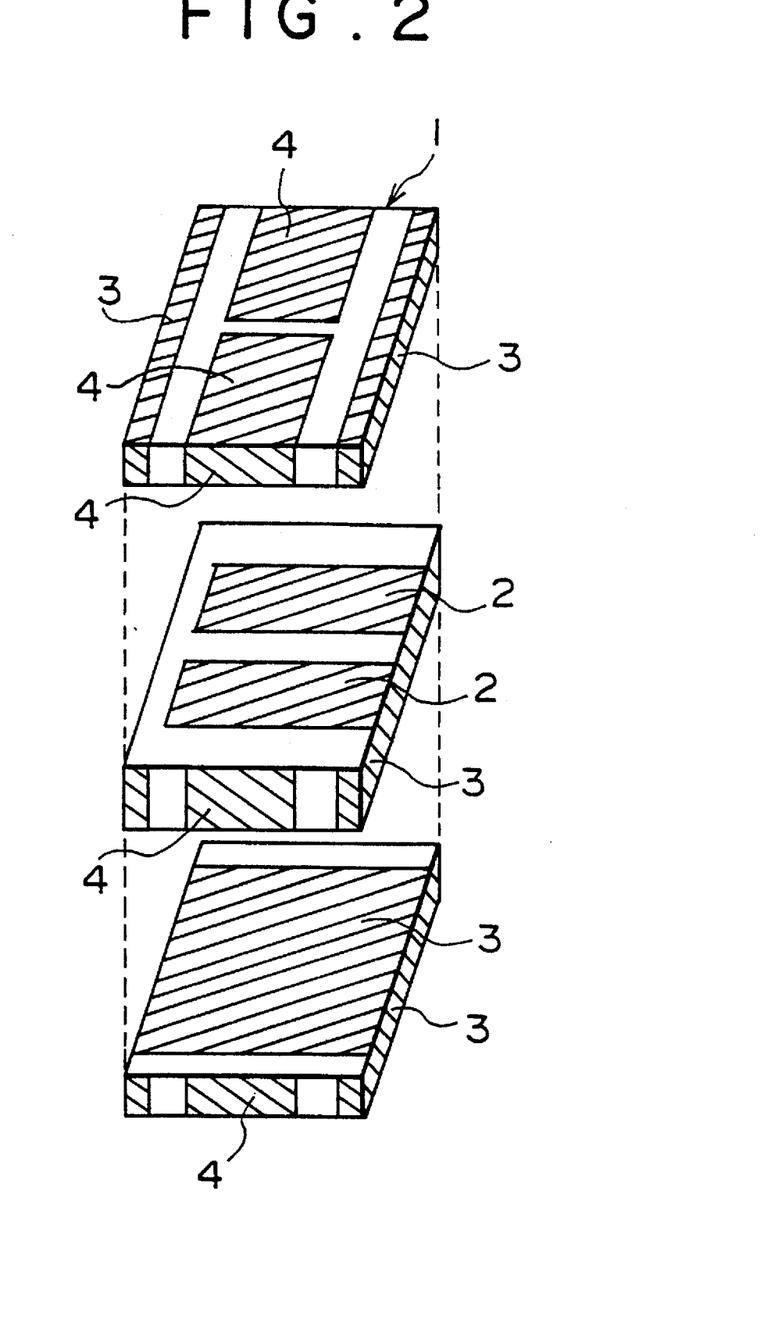
FIG. 2 is a perspective view illustrating, in a disassembled manner, a filter using the resonator of FIG. 1.

Next, the multilayer product is cut into a predetermined size and is fired to obtain a resonator or to obtain a filter using the resonator having structures as shown in FIGS. 1 and 2.

As the electrically conducting metal used as internal electrodes of a resonator or the like obtained by using the dielectric ceramic composition of the present invention, there can be used any widely known electrically conducting metal such as Pt, Pd, W, Mo as well as Au, Ag, Cu and the like without any particular limitation. The ceramic composition of the present invention can be fired at a low temperature, and makes it possible to use Au, Ag, Cu or the like that have relatively low melting points and small electric resistances enabling the Q-value of the resonance circuit to be increased among the above-mentioned electric conductors. In particular, it is desired to use Ag which is cheaper than Au and does not require any firing in the reducing atmosphere unlike Cu.

EXAMPLES

The dielectric ceramic compositions of the present invention will now be described in detail by way of Examples.

(Example 1)

Starting powders of $MgCO_3$, $CaCO_3$ and $TiO_2$ having purities of not smaller than 99% were weighed at ratios shown in Tables 1 and 2, followed by the addition of pure water as a medium. The mixture was stirred together using a ball mill made of $ZrO_2$ ball for 24 hours, dried and was then calcined at a temperature of 1200° C. for one hour.

A powder of $B_2O_3$ and a powder of $Li_2CO_3$ were weighed at ratios shown in Tables 1 and 2, and were mixed together with the calcined product obtained above using the ball mill made of $ZrO_2$ ball for 24 hours. As a binder, a polyvinyl alcohol was added thereto in an amount of 1% by weight. The mixture was then granulated, and the particles were press-molded under a force of about 1 t/cm$^2$ to obtain a molded article of a cylindrical shape having a diameter of 12 mm and a height of 10 mm.

TABLE 1

| | Composition | | | | | | | | |
|---|---|---|---|---|---|---|---|---|---|
| Sample No. | a parts by weight | b parts by weight | c parts by weight | $B_2O_3$ parts by weight | $Li_2CO_3$ parts by weight | Firing temp. (°C.) | Dielectric constant εr | Q-value 1/tan δ | Temperature coefficient τf (ppm/°C.) |
| 1-*1 | 40.0 | 0.3 | 59.7 | 5 | 5 | 950 | 18.8 | 3200 | −45 |
| 1-*2 | 35.0 | 0.1 | 64.9 | 5 | 5 | 950 | 19.0 | 3500 | −48 |
| 1-3 | 35.0 | 0.3 | 64.7 | 5 | 5 | 950 | 19.0 | 3500 | −39 |
| 1-4 | 34.0 | 0.4 | 65.6 | 5 | 5 | 950 | 19.1 | 4710 | −30 |
| 1-5 | 33.0 | 1.0 | 66.0 | 5 | 5 | 950 | 19.3 | 4560 | −10 |
| 1-6 | 31.0 | 3.0 | 66.0 | 5 | 5 | 950 | 20.6 | 3200 | 14 |

TABLE 1-continued

| Sample No. | Composition | | | | | Firing temp. (°C.) | Dielectric constant εr | Q-value 1/tan δ | Temperature coefficient τf (ppm/°C.) |
|---|---|---|---|---|---|---|---|---|---|
| | a parts by weight | b parts by weight | c parts by weight | $B_2O_3$ parts by weight | $Li_2CO_3$ parts by weight | | | | |
| 1-7 | 29.0 | 5.0 | 66.0 | 5 | 5 | 950 | 22.4 | 2960 | 27 |
| 1-8 | 28.0 | 6.5 | 65.5 | 5 | 5 | 950 | 22.9 | 2880 | 30 |
| 1-9 | 27.0 | 7.0 | 66.0 | 5 | 5 | 950 | 24.0 | 2800 | 36 |
| 1-10 | 25.0 | 7.0 | 68.0 | 5 | 5 | 950 | 24.2 | 2700 | 39 |
| 1-*11 | 25.0 | 9.0 | 66.0 | 5 | 5 | 950 | 24.3 | 2700 | 47 |
| 1-*12 | 20.0 | 7.0 | 73.0 | 5 | 5 | 950 | 24.5 | 2800 | 46 |
| 1-*13 | 35.0 | 7.0 | 58.0 | 5 | 5 | 950 | 19.0 | 1500 | 31 |
| 1-14 | 34.0 | 6.0 | 60.0 | 5 | 5 | 950 | 19.2 | 2000 | 26 |
| 1-15 | 33.0 | 5.0 | 62.0 | 5 | 5 | 950 | 19.4 | 2500 | 23 |
| 1-16 | 32.0 | 4.0 | 64.0 | 5 | 5 | 950 | 19.6 | 3000 | 22 |
| 1-17 | 32.0 | 2.0 | 66.0 | 5 | 5 | 950 | 19.6 | 4510 | 4 |
| 1-18 | 30.0 | 2.0 | 68.0 | 5 | 5 | 950 | 19.4 | 3000 | 6 |
| 1-19 | 29.0 | 1.0 | 70.0 | 5 | 5 | 950 | 19.2 | 2000 | −7 |
| 1-*20 | 27.0 | 1.0 | 72.0 | 5 | 5 | 950 | 19.0 | 1500 | −4 |

Samples marked with * lie outside the scope of the invention.

TABLE 2

| Sample No. | Composition | | | | | Firing temp. (°C.) | Dielectric constant εr | Q-value 1/tan δ | Temperature coefficient τf (ppm/°C.) |
|---|---|---|---|---|---|---|---|---|---|
| | a parts by weight | b parts by weight | c parts by weight | $B_2O_3$ parts by weight | $Li_2CO_3$ parts by weight | | | | |
| 1-*21 | 32.0 | 2.0 | 66.0 | 5 | 0.5 | 1100 | | not sintered | |
| 1-22 | 32.0 | 2.0 | 66.0 | 5 | 1 | 1050 | 19.4 | 3200 | −3 |
| 1-23 | 32.0 | 2.0 | 66.0 | 5 | 3 | 1000 | 19.1 | 2880 | 0 |
| 1-24 | 32.0 | 2.0 | 66.0 | 5 | 7 | 900 | 18.9 | 2540 | 2 |
| 1-25 | 32.0 | 2.0 | 66.0 | 5 | 10 | 900 | 18.5 | 2390 | 3 |
| 1-*26 | 32.0 | 2.0 | 66.0 | 5 | 15 | 850 | 18.0 | 1150 | 4 |
| 1-*27 | 32.0 | 2.0 | 66.0 | 1 | 5 | 1100 | | not sintered | |
| 1-28 | 32.0 | 2.0 | 66.0 | 3 | 5 | 1050 | 19.5 | 4000 | −4 |
| 1-29 | 32.0 | 2.0 | 66.0 | 7 | 5 | 950 | 19.1 | 3560 | −2 |
| 1-30 | 32.0 | 2.0 | 66.0 | 9 | 5 | 950 | 18.9 | 3230 | 0 |
| 1-31 | 32.0 | 2.0 | 66.0 | 15 | 5 | 900 | 18.5 | 2900 | 1 |
| 1-32 | 32.0 | 2.0 | 66.0 | 20 | 5 | 900 | 18.4 | 2490 | 3 |
| 1-*33 | 32.0 | 2.0 | 66.0 | 25 | 5 | 850 | 17.1 | 1280 | 4 |

Samples marked with * lie outside the scope of the invention.

Thereafter, the molded article was heated in the open air at a temperature of 400° C. for 4 hours. After the binder was removed, the molded article was fired in the open air at temperatures shown in Tables 1 and 2 for 60 minutes. Both end surfaces of the obtained cylinder were polished to form flat surfaces thereby to prepare a sample for evaluating dielectric properties.

To evaluate the dielectric properties, the samples for evaluation were measured by the dielectric cylindrical resonator method for their dielectric constants εr at resonance frequencies of 6 to 8 GHz and for their 1/tan δ (Q-value) at 7 GHz. The samples were further measured for their temperature coefficients τf of resonance frequency over a temperature range of from −40° to +85° C.

It will be understood from Tables 1 and 2 that the dielectric ceramic compositions of the present invention can be fired at relatively low temperatures of from 900° to 1050° C., and exhibit excellent properties such as dielectric constants εr of not smaller than 18, Q-values of not smaller than 2000, and temperature coefficients τf of resonance frequency of within ±40.

The obtained sintered products were melted with an alkali in sodium carbonate, and the molten product was dissolved in a solution of hydrochloric acid. Mg, Ca, Ti and B in the solution were quantitatively analyzed by the Inductively Coupled Plasma Atomic Emisson Spectoroscopy, and Li was quantitatively analyzed by the atomic absorption Spectoroscopy, Mg, Ca and Ti were expressed by the composition formula of the present invention, B was reckoned as $B_2O_3$, and Li was reckoned as $Li_2CO_3$, in order to make sure that they were lying within the range of composition of the present invention.

(Example 2)

Starting powders of $MgTiO_3$ and $CaTiO_3$ having purities of not smaller than 99% were weighed at ratios shown in Table 3, followed by the addition of pure water as a medium. The mixture was stirred together using a ball mill made of $ZrO_2$ ball for 24 hours, dried and was then calcined in the open air at a temperature of 1200° C. for one hour. A powder of $B_2O_3$ and a powder of $Li_2CO_3$ were weighed at ratios shown in Table 3, and were mixed together with the calcined product obtained above using the ball mill for 24 hours. As a binder, a polyvinyl alcohol was added thereto in an amount of 1% by weight. The mixture was then granulated, and the particles were press-molded under a force of about 1 t/cm² to obtain a molded article of a cylindrical shape having a diameter of 12 mm and a height of 10 mm.

TABLE 3

| Sample No. | Composition | | | Composition of main components | | | Firing temp. (°C.) | Dielectric constant $\varepsilon r$ | Q-value 1/tan $\delta$ | Temperature coefficient $\tau f$ (ppm/°C.) |
|---|---|---|---|---|---|---|---|---|---|---|
| | x parts by wt. | $B_2O_3$ parts by wt. | $Li_2CO_3$ parts by wt. | a parts by wt. | b parts by wt. | c parts by wt. | | | | |
| 2-*1  | 0  | 5  | 5   | 33.5 | 0   | 66.5 | 950  | 18.0 | 4750 | −50 |
| 2-2   | 1  | 5  | 5   | 33.2 | 0.4 | 66.4 | 950  | 19.0 | 5938 | −29 |
| 2-3   | 5  | 5  | 5   | 31.9 | 2.1 | 66.0 | 950  | 20.0 | 5641 | 4   |
| 2-4   | 8  | 5  | 5   | 30.9 | 3.3 | 65.8 | 950  | 21.0 | 4000 | 17  |
| 2-5   | 10 | 5  | 5   | 30.2 | 4.1 | 65.7 | 950  | 22.1 | 3800 | 25  |
| 2-6   | 15 | 5  | 5   | 28.5 | 6.2 | 65.3 | 950  | 23.3 | 3610 | 30  |
| 2-*7  | 20 | 5  | 5   | 26.8 | 8.2 | 66.0 | 950  | 24.5 | 3430 | 45  |
| 2-*8  | 5  | 5  | 0.5 | 31.9 | 2.1 | 66.0 | 1100 | not sintered | | |
| 2-9   | 5  | 5  | 1   | 31.9 | 2.1 | 66.0 | 1050 | 19.7 | 4000 | −4  |
| 2-10  | 5  | 5  | 3   | 31.9 | 2.1 | 66.0 | 1000 | 19.4 | 3600 | 0   |
| 2-11  | 5  | 5  | 7   | 31.9 | 2.1 | 66.0 | 900  | 19.3 | 3240 | 2   |
| 2-12  | 5  | 5  | 10  | 31.9 | 2.1 | 66.0 | 900  | 19.0 | 3010 | 4   |
| 2-*13 | 5  | 5  | 15  | 31.9 | 2.1 | 66.0 | 850  | 18.6 | 1300 | 4   |
| 2-*14 | 5  | 1  | 5   | 31.9 | 2.1 | 66.0 | 1100 | not sintered | | |
| 2-15  | 5  | 3  | 5   | 31.9 | 2.1 | 66.0 | 1050 | 19.7 | 4950 | −5  |
| 2-16  | 5  | 7  | 5   | 31.9 | 2.1 | 66.0 | 950  | 19.4 | 4455 | −4  |
| 2-17  | 5  | 9  | 5   | 31.9 | 2.1 | 66.0 | 950  | 19.3 | 4010 | 0   |
| 2-18  | 5  | 15 | 5   | 31.9 | 2.1 | 66.0 | 900  | 19.0 | 3609 | 1   |
| 2-19  | 5  | 20 | 5   | 31.9 | 2.1 | 66.0 | 900  | 19.0 | 3248 | 3   |
| 2-*20 | 5  | 25 | 5   | 31.9 | 2.1 | 66.0 | 850  | 17.5 | 1400 | 4   |

Samples marked with * lie outside the scope of the invention.

Thereafter, the molded article was heated in the open air at a temperature of 400° C. for 4 hours. After the binder was removed, the molded article was fired in the open air at temperatures shown in Table 3 for 60 minutes. Both end surfaces of the obtained cylinder were polished to form flat surfaces thereby to prepare a sample for evaluating dielectric properties.

To evaluate the dielectric properties, the samples for evaluation were measured by the dielectric cylindrical resonator method for their dielectric constants $\varepsilon r$ at resonance frequencies of 6 to 8 GHz and for their 1/tan $\delta$ or Q-value at 7 GHz. The samples were further measured for their temperature coefficients $\tau f$ of resonance frequency over a temperature range of from −40° to +85° C. The temperature coefficient $\tau f$ of resonance frequency was found by averaging temperature coefficients $\tau f1$ over a range of from −40° to 20° C. and temperature coefficients $\tau f2$ over a range of from 25° to 80° C. with the resonance frequency at 25° C. as a reference.

It will be understood from Table 3 that the dielectric ceramic compositions of the present invention can be fired at relatively low temeratures of not higher than 1050° C., and exhibit excellent properties such as dielectric constants $\varepsilon r$ of not smaller than 19, Q-values of not smaller than 3000, and temperature coefficients $\tau f$ of resonance frequency of within ±30.

(Example 3)

A dielectric powder No. 2–3 used in Example 2 was thrown into a polyethylene pot together with an acrylic binder and zirconia, followed by the addition of pure water, and the mixture was mixed together with a ball mill made of $ZrO_2$ for 24 hours. The mixture was then deairing and was formed into a green tape having a thickness of 100 μm by a doctor blade process. Onto the green tape was printed a conductor pattern using a paste for printing Ag. Then, 34 pieces of green tapes were multilayer and press-adhered with the green tapes printed with the conducting pattern sandwiched among them under the conditions of a temperature of 100° C. and a pressure of 300 kgf/cm².

The multilayer product was cut into a predetermined size, fired in the air at a temperature of 900° C. for 2 hours to obtain a resonator of the strip line-type and a filter having structures shown in disassembled perspective views of FIGS. 1 and 2.

The dielectric ceramics 1 constituting the strip line-type resonator of FIG. 1 has a three-layer structure, and is formed as a unitary structure being fired together with the conductor. An electrode 2 for resonance is formed on one layer of the dielectric ceramics 1, an earth electrode 3 is formed on another layer, and an input/output electrode 4 and the earth electrode 3 are formed on the surface of the dielectric ceramics 1 and are extending onto the side surface. An end of the electrode 2 for resonance is connected to the earth electrode 3 on the side surface. FIG. 2 illustrates a filter wherein the same reference numerals denote the same portions as those of FIG. 1.

The dielectric ceramic between the earth electrode 3 and the electrode 2 for resonance is formed by laminating the above-mentioned green tapes in 15 layers, the dielectric ceramic between the input/output electrode 4 and the electrode 2 for resonance is formed by laminating the green tapes in 15 layers, and the dielectric ceramic of the lower most layer is formed by laminating the green tape in 4 layers.

The thus obtained strip line-type resonator and the filter were measured for their resonance characteristics and filter characteristics by using a network analyzer (HP 8719C). As a result, the resonator exhibited a Q-value of 185 (1.9 GHz), and the filter exhibited a center frequency of 1.9 GHz and an insertion loss of 0.7 dB.

On the other hand, a resonator or a filter having the same thickness as that of the present invention and is made of a material comprising an anorthite-calcium titanate glass and $TiO_2$ (εr 16, Q-value 330) disclosed in Japanese Laid-Open Patent Publication No. 292460/1992, exhibited a Q-value of 120 (1.9 GHz) and an insertion loss of 1.0 dB. This result tells that the electronic parts using the dielectric ceramic composition of the present invention exhibit higher Q-values and lower insertion losses than those of the conventional resonators.

(Example 4)

Starting powders of $MgTiO_3$ and $CaTiO_3$ having purities of not smaller than 99% were weighed at ratios shown in Table 4, followed by the addition of water as a medium. The mixture was stirred using a ball mill for 24 hours, dried and was then calcined at a temperature of 1200° C. for one hour.

A powder of $B_2O_3$ and a powder of $Na_2CO_3$ were weighed at ratios shown in Table 4, and were mixed together with the calcined product obtained above using the ball mill for 24 hours. As a binder, a polyvinyl alcohol was added thereto in an amount of 1% by weight. The mixture was then granulated, and the particles were press-molded under a force of about 1 t/cm² to obtain a molded article of a cylindrical shape having a diameter of 12 mm and a height of 10 mm.

Thereafter, the molded article was heated in the open air at a temperature of 400° C. for 4 hours. After the binder was removed, the molded article was fired in the open air at temperatures shown in Table 4 for 60 minutes.

Both end surfaces of the obtained cylinder were polished to form flat surfaces thereby to prepare a sample for evaluating dielectric properties.

To evaluate the dielectric properties, the samples for evaluation were measured by the dielectric cylindrical resonator method for their dielectric constants εr at a resonance frequency that is set to 8 GHz and for their 1/tan δ or Q-value at 8 GHz. The samples were further measured for their temperature coefficients τf of resonance frequency over a temperature range of from −40° to +85° C. The results were as shown in Table 4.

It will be understood from Table 4 that the dielectric ceramic compositions of the present invention can be fired at relatively low temperatures of from 900° to 1050° C., and exhibit excellent properties such as dielectric constants εr of not smaller than 19, Q-values of not smaller than 1500, and temperature coefficients τf of resonance frequency of within ±30.

We claim:

1. A dielectric ceramic composition comprising, as main components, oxides of metal elements Mg, Ca and Ti and represented by a composition formula on the weight basis, $aMgO \cdot bCaO \cdot cTiO_2$ where a, b and c satisfy the following relationships:

$25 \leq a \leq 35$, $0.3 \leq b \leq 7$, $60 \leq c \leq 70$, and $a+b+c=100$, blended with boron-containing compound selected from the group consisting of metal boron, boron oxide, colemanite and calcium borate in an amount by weight equivalent to a boron content of from 3 to 20 parts by weight of $B_2O_3$ per 100 parts by weight of the main components, and an alkali metal-containing compound selected from the group consisting of oxide of lithium, oxide of sodium, oxide of potassium, lithium carbonate, sodium carbonate and potassium carbonate in an amount by weight equivalent to an alkali metal content of from 1 to 12 parts by weight of an alkali metal carbonate per 100 parts by weight of the main components.

2. The ceramic composition of claim 1 wherein the composition formula of main components comprising the oxides of Mg, Ca and Ti satisfies the formula:

$(100-x)MgTiO_3 \cdot xCaTiO_3$ where x lies within a range of $1 \leq x \leq 15$.

3. The ceramic composition of claim 1 or 2, wherein the ceramic composition is blended with a lithium-containing compound as an alkali metal-containing compound in an amount of from 1 to 10 parts by weight.

TABLE 4

| Sample No. | Composition | | | Firing temp. (°C.) | Dielectric constant εr | Q-value 1/tan δ | Temperature coefficient τf (ppm/°C.) |
|---|---|---|---|---|---|---|---|
| | x parts by wt. | $Na_2CO_3$ parts by wt. | $B_2O_3$ parts by wt. | | | | |
| 4-*1 | 0 | 7 | 5 | 950 | 18.0 | 1700 | −53 |
| 4-2 | 1 | 7 | 5 | 950 | 19.0 | 2010 | 30 |
| 4-3 | 5 | 7 | 5 | 950 | 20.0 | 1805 | 3 |
| 4-4 | 8 | 7 | 5 | 950 | 21.0 | 1520 | 15 |
| 4-5 | 10 | 7 | 5 | 950 | 21.9 | 1550 | 20 |
| 4-6 | 15 | 7 | 5 | 950 | 23.5 | 1530 | 30 |
| 4-*7 | 20 | 7 | 5 | 950 | 25.5 | 1570 | 40 |
| 4-*8 | 5 | 0.7 | 5 | 1100 | | not sintered | |
| 4-9 | 5 | 1.0 | 5 | 1050 | 19.5 | 1500 | −3 |
| 4-10 | 5 | 5 | 5 | 1000 | 19.4 | 1580 | 0 |
| 4-11 | 5 | 9 | 5 | 900 | 19.3 | 1550 | 3 |
| 4-12 | 5 | 12 | 5 | 900 | 19.1 | 1530 | 6 |
| 4-*13 | 5 | 17 | 5 | 850 | 18.6 | 780 | 6 |
| 4-*14 | 5 | 7 | 1 | 1100 | | not sintered | |
| 4-15 | 5 | 7 | 3 | 1050 | 19.6 | 1980 | −7 |
| 4-16 | 5 | 7 | 7 | 950 | 19.4 | 1730 | −6 |
| 4-17 | 5 | 7 | 9 | 950 | 19.2 | 1520 | 1 |
| 4-18 | 5 | 7 | 15 | 900 | 19.3 | 1620 | 0 |
| 4-19 | 5 | 7 | 20 | 900 | 19.0 | 1680 | 3 |
| 4-*20 | 5 | 7 | 25 | 850 | 17.5 | 980 | 4 |

Samples marked with * lie outside the scope of the invention.

4. The ceramic composition of claim 3, wherein the lithium-containing compound comprises $Li_2CO_3$.

5. The ceramic composition of claim 1 or 2, wherein the ceramic composition is blended with a sodium-containing compound as an alkali metal-containing compound in an amount of from 1 to 12 parts by weight.

6. The ceramic composition of claim 5, wherein the sodium-containing compound comprises $Na_2CO_3$.

7. A multilayer resonator comprising:

a plurality of layers of dielectric ceramic composed of a dielectric ceramic composition, and a plurality of internal conductors formed among the layers, wherein the dielectric ceramic composition comprises, as main components, oxides of metal elements Mg, Ca and Ti and represented by a composition formula on the weight basis, $aMgO \cdot bCaO \cdot cTiO_2$ where a, b and c satisfy the following relationships:

$25 \leqq a \leqq 35$, $0.3 \leqq b \leqq 7$, $60 \leqq c \leqq 70$, and $a+b+c=100$, blended with a boron-containing compound selected from the group consisting of metal boron, boron oxide, colemanite and calcium borate in an amount by weight equivalent to a boron content of from 3 to 20 parts by weight of $B_2O_3$ per 100 parts by weight of the main components, and an alkali metal-containing compound selected from the group consisting of oxide of lithium, oxide of sodium, oxide of potassium, lithium carbonate, sodium carbonate and potassium carbonate in an amount by weight equivalent to an alkali metal content of from 1 to 12 parts by weight of the alkali metal carbonate per 100 parts by weight of the main components.

8. The resonator of claim 7, wherein at least one of the internal conductors comprises Ag.

9. A multilayer filter, comprising:

a multilayer resonator, the multilayer resonator comprising:

a plurality of layers of dielectric ceramics composed of a dielectric ceramic composition, and a plurality of internal conductors formed among the layers, wherein the dielectric ceramic composition comprises, as main components, oxides of metal elements Mg, Ca and Ti and represented by a composition formula on the weight basis, $aMgO \cdot bCaO \cdot cTiO_2$ where a, b and c satisfy the following relationships:

$25 \leqq a \leqq 35$, $0.3 \leqq b \leqq 7$, $60 \leqq c \leqq 70$, and $a+b+c=100$, blended with a boron-containing compound selected from the group consisting of metal boron, boron oxide, colemanite and calcium borate in an amount by weight equivalent to a boron content of from 3 to 20 parts by weight of $B_2O_3$ per 100 parts by weight of the main components, and an alkali metal-containing compound selected from the group consisting of oxide of lithium, oxide of sodium, oxide of potassium, lithium carbonate, sodium carbonate and potassium carbonate in an amount by weight equivalent to an alkali metal content of from 1 to 12 parts by weight of the alkali metal carbonate per 100 parts by weight of the main components.

10. The ceramic composition of claim 1, wherein the boron-containing compound comprises $B_2O_3$.

11. The ceramic composition of claim 1, wherein the alkali metal-containing compound comprises an alkali metal carbonate.

* * * * *